Figure 1:
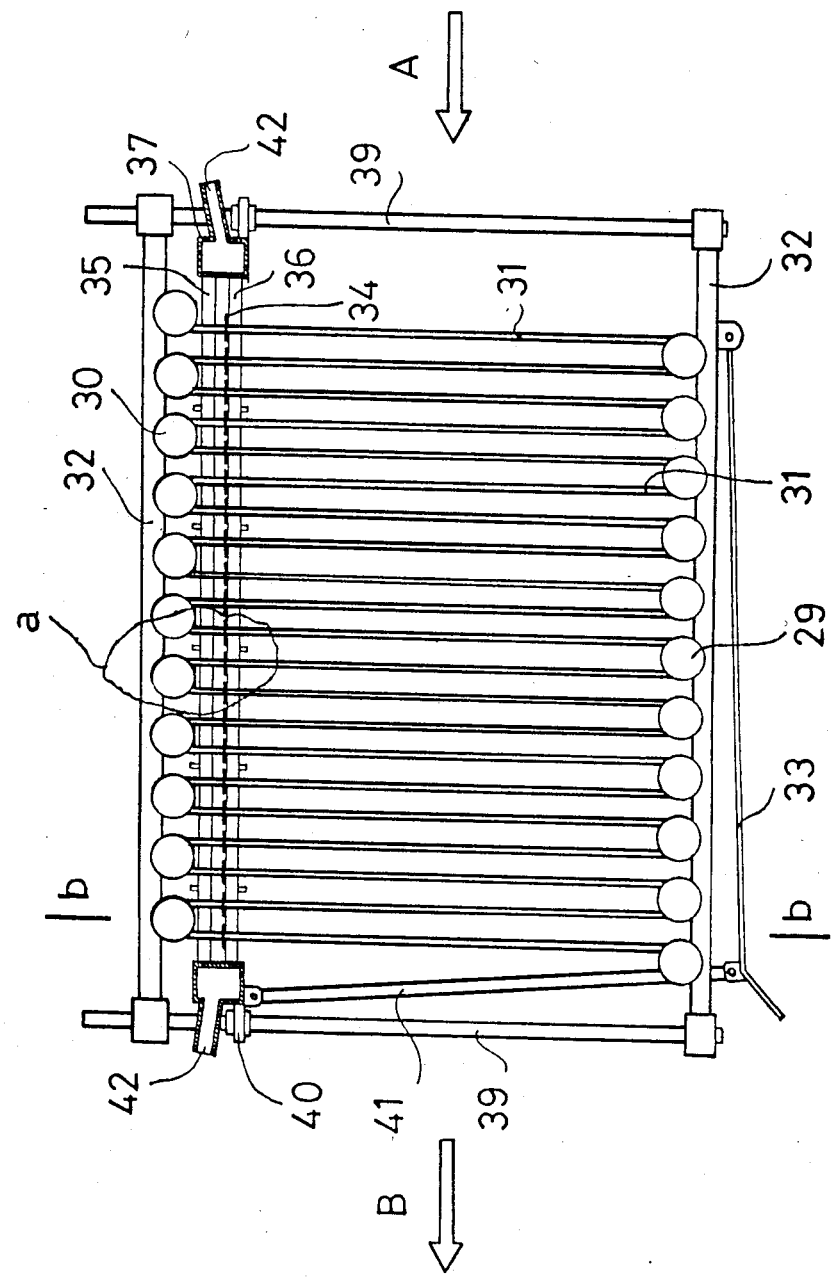

United States Patent [19]
Weitman

[11] Patent Number: 4,569,388
[45] Date of Patent: Feb. 11, 1986

[54] APPARATUS FOR THE TREATMENT OF A CONTAMINATED GAS OF ELEVATED TEMPERATURE

[76] Inventor: Jacob Weitman, Tryffelstigen 8, S-611 63 Nykoping, Sweden

[21] Appl. No.: 380,743
[22] PCT Filed: Sep. 11, 1981
[86] PCT No.: PCT/SE81/00255
§ 371 Date: May 12, 1982
§ 102(e) Date: May 12, 1982
[87] PCT Pub. No.: WO82/00959
PCT Pub. Date: Apr. 1, 1982

[51] Int. Cl.[4] .......................... F28G 1/08; F28G 1/16; F28G 15/04; F28G 9/00
[52] U.S. Cl. .................................... 165/94; 165/95; 15/104.04; 15/104.16; 122/379; 122/390
[58] Field of Search .................... 165/94, 95, 150; 15/104.04, 104.16; 122/379, 390, 391, 392

[56] References Cited

U.S. PATENT DOCUMENTS

| | | |
|---|---|---|
| 690,795 | 1/1902 | Thwaite . |
| 702,939 | 6/1902 | Gibbons ..................... 122/379 |
| 1,302,458 | 4/1919 | Varcoe ...................... 122/379 |
| 1,464,798 | 8/1923 | Anderson .................. 165/95 |
| 1,898,727 | 2/1933 | Hoppes ..................... 165/95 |
| 2,037,169 | 4/1936 | Judd et al. ................ 122/379 |
| 2,112,896 | 4/1938 | Husband ................... 122/379 |
| 2,306,738 | 12/1942 | MacGregor ............... 165/95 |
| 2,890,862 | 6/1959 | Heller ........................ 15/104.04 |
| 2,924,435 | 2/1960 | Curtis . |
| 3,171,472 | 3/1965 | Bauer ........................ 165/95 |
| 3,609,943 | 10/1971 | Richter . |
| 4,386,652 | 6/1983 | Dragojevic ................ 165/150 |

FOREIGN PATENT DOCUMENTS

| | | |
|---|---|---|
| 1084239 | 6/1960 | Fed. Rep. of Germany . |
| 2320723 | 3/1979 | Fed. Rep. of Germany . |
| 737440 | 12/1932 | France ....................... 165/95 |
| 1308703 | 12/1962 | France . |
| 47806 | 6/1978 | Japan ......................... 165/95 |
| 146755 | 10/1902 | Netherlands .............. 15/104.04 |
| 76363 | 11/1929 | Sweden ..................... 165/95 |

OTHER PUBLICATIONS

Derwent's Abstract No. A 8511, D/05, SU 735 903, 5/28/80.

Primary Examiner—William R. Cline
Assistant Examiner—John K. Ford
Attorney, Agent, or Firm—Lewis H. Eslinger

[57] ABSTRACT

An apparatus for the treatment of a gas, air in particular, having an elevated temperature and being contaminated by condensable pollutions, to purify the gas and recover heat. The apparatus aims at a high efficiency of heat recovery as well as purification of the gas while simultaneously avoiding environmental pollutants problems.

According to the invention the method is characterized by transferring heat from the gas to a heat collecting fluid by means of a system of heat transferring surfaces, while applying to the gas a turbulent flow. By cooling the gas, the contaminations present therein are transferred into a solid or liquid state, the turbulence enhancing an aggregation of condensed contaminations and the deposition of the contaminations onto the heat transferring surfaces, said surfaces then being mechanically and/or chemically and/or thermically cleaned, as the case may be with the apparatus used for executing the method in operation.

An apparatus according to the invention comprises a plurality of tubes (31) for a heat collecting fluid, said tubes being arranged perpendicularly to the direction of flow (A-B) of the gas, said tubes each being provided with a cleaning member (34) arranged to be exposed to a reciprocating movement along the tube, for which purpose said cleaning member are connectable with driving means (35, 36). Fluid spray nozzles are also located on the drive means.

4 Claims, 3 Drawing Figures

APPARATUS FOR THE TREATMENT OF A CONTAMINATED GAS OF ELEVATED TEMPERATURE

The present invention relates to a method of treating a gas of elevated temperature, which is contaminated by mainly condensable contaminations, said gas in many cases consisting of air, in order to simultaneously purify the gas and recover heat therefrom, as well as removing contaminations from the equipment used for the purification.

In many industries, large quantities of contaminated air is being produced, said gas being heated so that recovering heat therefrom will seem attractive. Contaminations present in the air may be of different kinds, such as from processes within the plastic industry, the surface treatment industry, textile, or paper industry. Common is the difficulty to separate them from the gaseous carrier due to their chemical or physical characters or because of the fact that the contaminations after having been separated out, give rise to such severe treatment or pollution problems used for their separation so that the apparatus does not function to satisfaction. In particular, this is the case with contaminations which in a condensed and cooled-down state attain a high viscosity and show high adhesion to surfaces. As a consequence thereof, the purification in such situations has only been driven so that it has been possible to let the gas enter into the surrounding atmosphere without causing severe environmental problems. Because of the burdensome contamination problems created, substantial heat recovery from the gas has not been possible.

Efforts have been made as a solution to the problems referred to above to use separators in which the surfaces have consisted of glass, the idea being that the glass would present poor adhesion to contaminations deposited thereon so that the contamination problems would be diminished. In practice, however, the function of this type of equipment is poor and in many cases a dismounting and cleaning is required.

An object of the present invention is to eliminate the problems referred to and to provide a method and an apparatus for treatment of gas of elevated temperature, primarily air, so that its condensable contaminations are separated and simultaneously heat recovery is obtained and the separated contaminations are removed. This object is attained according to the invention by use of a method or an apparatus for carrying out the method, respectively, having characteristics according to the appended claims.

Figure 2:
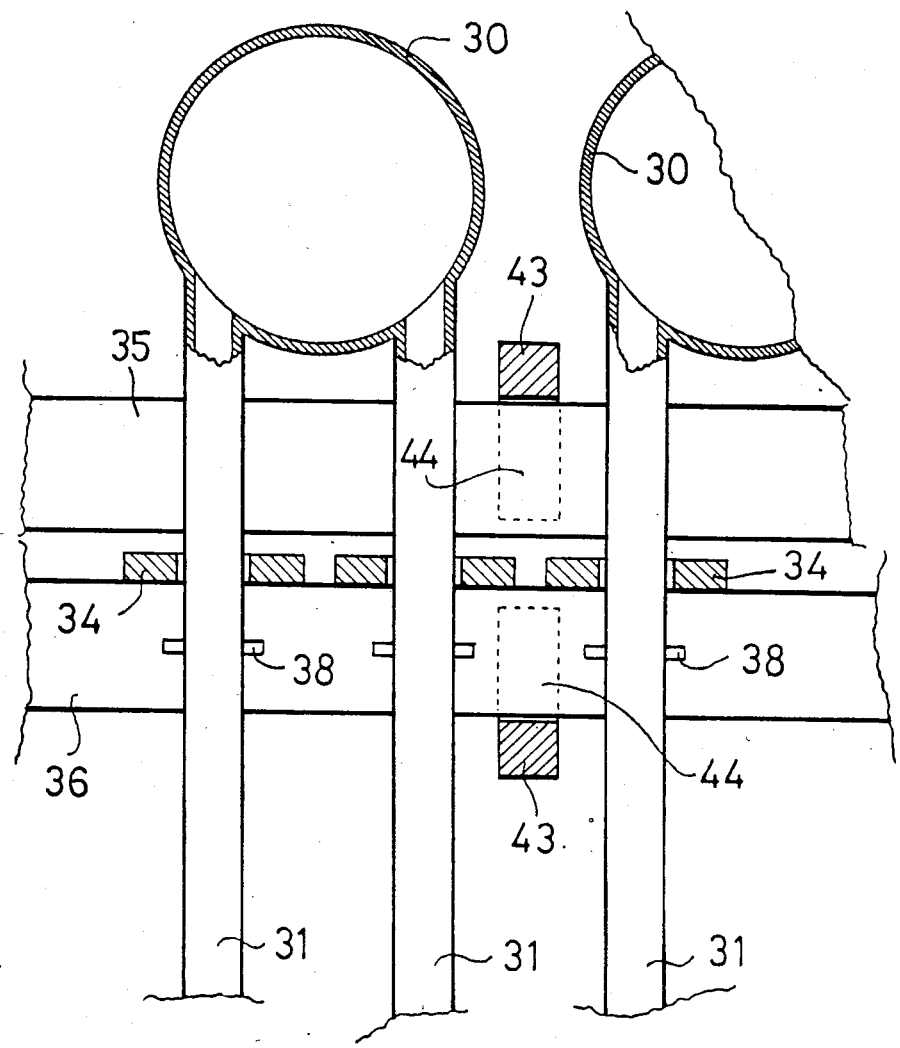
Figure 3:
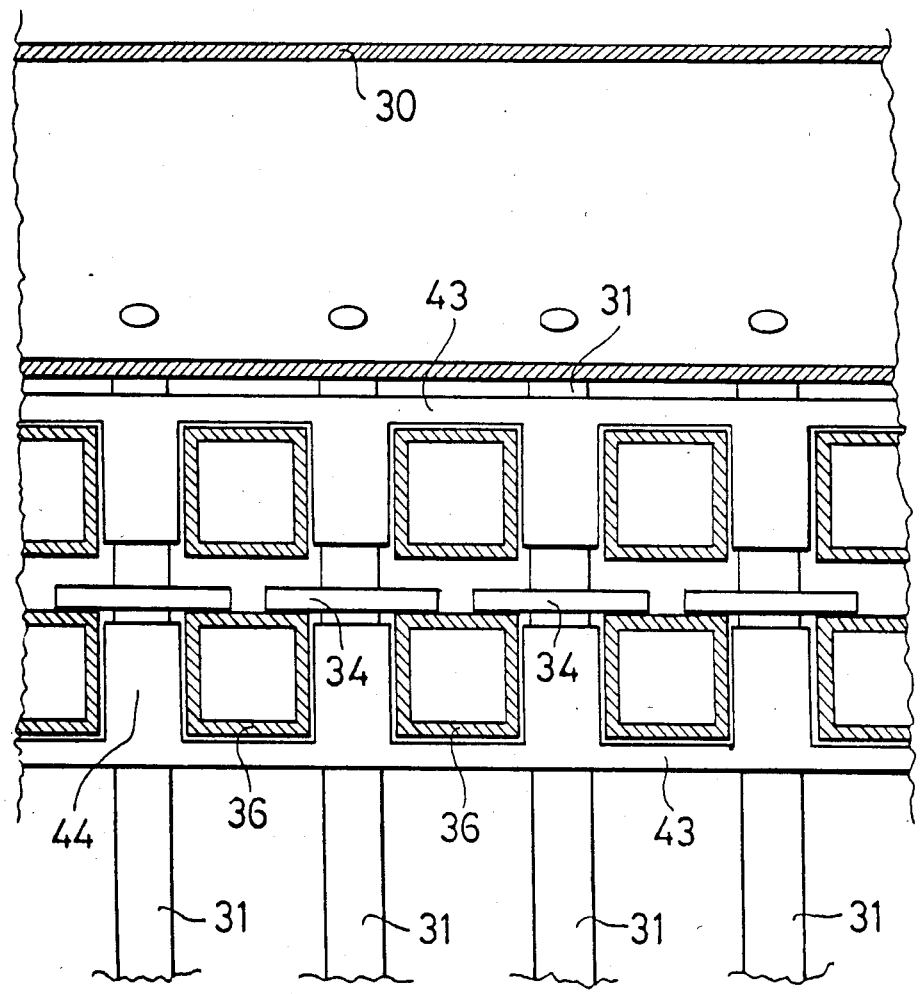

In the following, the invention will be described more closely with reference to the accompanying drawings, in which FIG. 1 is a longitudinal section through an apparatus for carrying out the method according to the invention, FIG. 2 is a longitudinal section of a detail indicated a in FIG. 1, and FIG. 3 is a corresponding cross-section.

The apparatus illustrated by FIGS. 1-3 thus shows an apparatus for the purification of a gas by condensing under simultaneous heat recovery is provided as well as the separated contaminations are removed without the apparatus being taken out of operation.

In said apparatus gas to be purified, in many cases consisting of air, is flowing in FIG. 1 in the direction indicated by arrows A and B, the flow being guided by shells or the like (not shown). As shown in FIG. 1, the apparatus comprises a lower, horizontal group of collecting tubes 29 and an upper group of collecting tubes 30, extending parallel to the collecting tubes 29 of the lower group. The tubes 29 and the tubes 30 are arranged perpendicular to the flow direction of the gas indicated by arrows A and B at selected mutual distances from each other. Vertical depositing and heat exchanging tubes 31 extend between the upper collecting tubes 30 and the lower collecting tubes 29. Parallel rows of such tubes 31 are arranged in the longitudinal direction of the collecting tubes 29 and 30. To have the apparatus to work according to the counter-current principle, the lower collecting tube 29 farthest to the left in FIG. 1 is provided with an inlet (not shown) for a heat recovering medium, while the upper collecting tube 30 located farthest to the right in FIG. 1 has a corresponding outlet (not shown). The collecting tubes are secured to a support arrangement, comprising longitudinal parts 32. Further, a collecting plate is arranged below the lower collecting tubes 29, said plate being arranged in form of a flap 33, the function of which will be described below.

Due to the arrangement of the tubes 31 and the collecting tubes 29 and 30 as described, the apparatus will operate according to a combination of cross-current and counter-current principles. A favourable turbulence is attained by the air flow from A to B meeting the tubes 31, this being favourable, on one hand, by an improved heat transmission between the air and the tubes 31 than would be the case with a flow along the tubes, and, on the other hand, by an improved separation by causing the contaminations to get lumpy.

A heat absorbing medium is being forced through the tube system 31, said medium recovering heat from the air. Condensable contaminations carried by the air will then precipitate in liquid state (or sublimated to solid state) and be deposited onto the tubes 31, the air being purified to no longer contain substantial quantities of contaminations which are condensable at the temperature in question. When such contaminations deposited onto the tubes 31 are light they will flow along the tubes 31 down between the collecting tubes 29 and be deposited on the collecting plate 33.

The shown embodiment of the invention being intended for the separation of pollutions showing strong adherence and high viscosity, cleaning of the tubes 31 will be necessary. Therefore, the apparatus has a mechanical and thermic cleaning device. In FIGS. 2 and 3 is shown that each one of the tubes 31 is provided with a cleaning member 34 which is displaceable up and down along the length of the tube. Said member 34 may have the shape of a washer, the center aperture of which has such a fit to the tube 31 that the displacement thereof along the tube is unimpeded while maintaining efficient scraping action. Driving members to move the washers along the vertical tubes 31 are arranged between each pair of adjacent rows of the tubes 31, said members forming an upper group of drive members 35 and a lower group of drive members 36. The drive members 35 and 36 have a width to substantially fill up the space between the tubes 31, said cleaning members 34 when idle resting on the lower drive members 36. At their ends the drive members are connected to collecting boxes 37. Outside the pattern of tubes 31, the ends of the collecting boxes 37 are connected to each other by means of longitudinal (along the direction of arrows A and B) beams (not shown) to form a stiff structure. Further, in order to maintain correct distances between the drive members 35 and 36, and also to enhance the stiffness of the structure, cam-shaped stiffening and distance members 43 are arranged at selected distances from each other along the flow path A-B. Said stiffening and distance members 43 comprise a lower group arranged for cooperation with the lower drive members 36, the stiffening and distance members of this group being arranged perpendicular to the drive members and arranged within the spaces between adjacent rows of tubes 31. The stiffening and distance members further comprise indentations 44, said indentations extending into the spaces between adjacent drive members with a proper fit, preventing bending of the drive members. An upper group of stiffening and distance members 44 is arranged to cooperate with the upper drive members 35, said members 44 being arranged straight above the corresponding members of the lower group and fulfilling an entirely analogous function.

In order to obtain heat exchanging and depositing surfaces which are as large as possible, the vertical tubes should be made slim and have thin walls. In practice, this implies that the tubes 31 cannot be held steadily positioned or straight along all their length, in part due to thermic distortion and in part due to manufacturing tolerances. Consequently, it is of utmost importance that the cleaning members 34 are free to move within sufficiently large ranges in planes perpendicular to the axes of the tubes. Correspondingly, it is of importance that the distances between the tubes and the drive members 35 and 36 as well as between the tubes and the stiffening and distance members are kept sufficiently large.

Due to the vertical displacement of the drive members mentioned above, the cleaning members 34 will be steadily displaced along the vertical tubes 31 while still being allowed to move laterally, this being of importance to save the tubes 31 from destruction. In order to provide for a thermic cleaning in addition to the mechanical cleaning of the tubes 31, the drive members 35 and 36 constitute tubes, preferably quadrangular ones, of which at least the lower ones are provided with nozzle apertures 38 in front of each tube 31. Further, the collecting boxes 37 have inlets 42 for, as the case may be, steam and/or solvents, and are in flow connection with at least the lower drive members 36.

To make possible the displacement mentioned above of the cleaning members 34 along the tubes 31, the support structure 32 carries vertical screws 39, the frame structure comprising the collecting boxes 37 being provided with corresponding nuts 40. A screw 39 being located at each edge of the apparatus, the frame structure with the drive members 35 and 36 can be displaced in the longitudinal direction of the tubes 31 by synchronous rotation of said screws, said drive members pushing the cleaning members 34 along the tubes. Simultaneously, the nozzles 38 will be moving along the tubes 31.

In certain cases it may be of importance that no steam, solvent or deposited contamination enter the gas or air system during the cleaning of the vertical tubes. To provide for this the apparatus according to the invention comprises flue dampers (not shown) arranged before the entrance and after the exit, respectively, of the row of tubes 31, said dampers closing the flue while the collecting plate, flap 33 is being opened, the flap 33 being hinged in the support structure 32 and connected to the frame by means of a stay 41 connected to the frame structure. Consequently, the steam or other fluid introduced into the apparatus for cleaning the operative surfaces thereof will, in addition to cleaning the vertical tubes, flow along the flap 33 to clean the flap as well.

When contaminated air or other gas flows through the apparatus in the direction of arrows A and B as mentioned above, the air or other gas, respectively, is imparted a vigorous turbulence when passing through the pattern of vertical tubes 31, the temperature thereof simultaneously being decreased by heat transmission to the heat collecting fluid circulated through the tubes 31 to provide for a combination of counter-current and cross-current principles. Due to the decrease of temperature, the condensable contaminations are brought to a solid or liquid state, the strong turbulence providing for an aggregation of the condensed contamination to large lumps of pollution material. Such large lumps are then deposited onto the vertical tubes 31. After the air has passed through the apparatus, its temperature has been decreased and the temperature of the heat collecting medium correspondingly increased. To maintain a continuity in the treatment of the gas, the pollutions deposited onto the vertical tubes are scraped off at selected intervals to be kept substantially clean.

The invention can be modified within the scope of the invention.

What is claimed is:

1. A tube type heat exchanger apparatus for recovering heat from a high temperature gas containing condensable contaminations and for removing contaminations deposited on the tubes, said apparatus comprising upper and lower rows of horizontally arranged parallel collecting tubes for a heat recovery medium and a plurality of heat exchanging tubes extending between and in fluid communication with said upper and lower collecting tubes, wherein said heat exchanging tubes are vertically arranged in rows extending between and in fluid communication with said upper and lower collecting tubes, wherein said heat exchanging tubes are vertically arranged in rows extending longitudinally along the collecting tubes and in columns extending in the transverse direction thereof, mechanical cleaning members in the form of a washer arranged around each said heat exchanging tube and of such size so as to allow lateral movement relative to said heat exchanging tube, upper and lower drive members in the form of a plurality of horizontally arranged tubes extending between said heat exchanging tubes and having stiffening and distance members at mutually spaced-apart locations along said upper and lower drive member tubes, the ends of said drive member tubes being in fluid communication with collecting boxes arranged thereat, and said drive member tubes being provided with fluid spray nozzles located in front of each heat exchanging tube for spraying hot solvent onto said heat exchanging tubes to further clean said tubes, said cleaning members being arranged between said upper and lower drive member tubes to move therewith along said heat exchanging tubes.

2. An apparatus in accordance with claim 1; wherein two heat exchanger tubes are arranged side by side along each of the upper and lower collecting tubes.

3. An apparatus in accordance with claim 2; wherein said drive member tubes are carried by a frame structure provided with nuts in engagement with vertically arranged screws rotating synchronously, thereby pushing said cleaning member along said heat exchanging tubes.

4. An apparatus in accordance with claim 1; wherein said drive member tubes have a quadrangular cross section.

* * * * *